Figure 1:
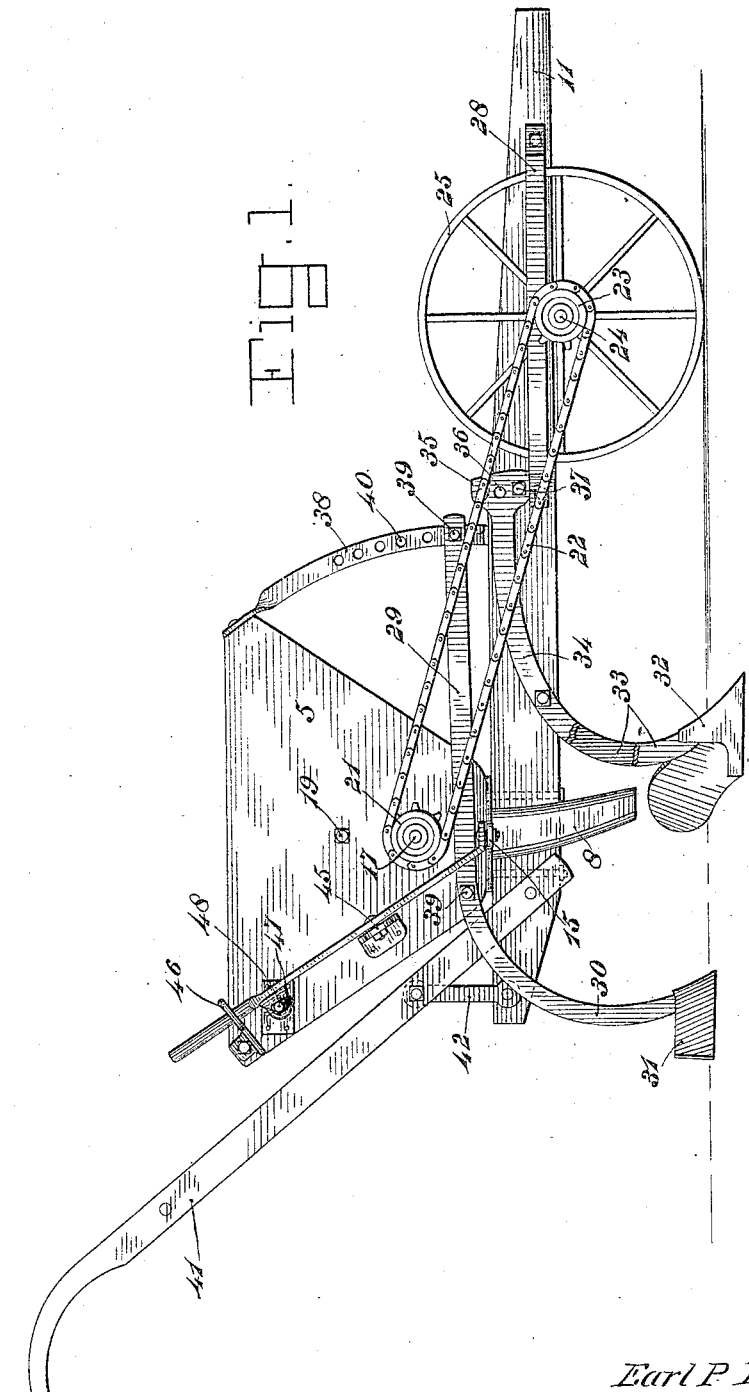

E. P. & J. T. PATTERSON.
COMBINED SEED PLANTER AND FERTILIZER DISTRIBUTER.
APPLICATION FILED SEPT. 8, 1909.

942,792.

Patented Dec. 7, 1909.
2 SHEETS—SHEET 1.

Witnesses
K. Allen
Wm. Bagger

Inventors
Earl P. Patterson and
Jacob T. Patterson.
By Victor J. Evans
Attorney

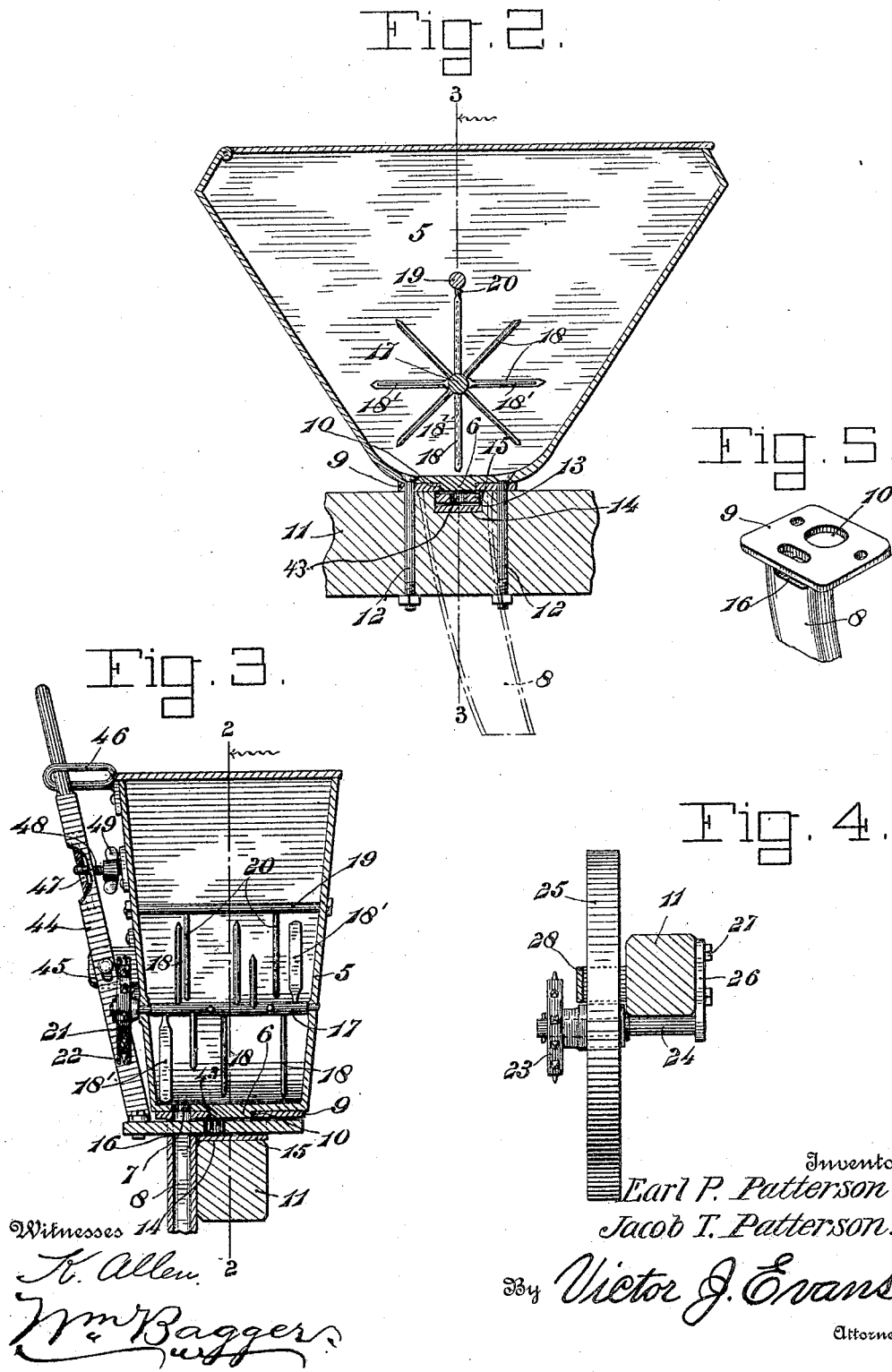

UNITED STATES PATENT OFFICE.

EARL P. PATTERSON, OF GRIFFIN, AND JACOB T. PATTERSON, OF MILNER, GEORGIA.

COMBINED SEED-PLANTER AND FERTILIZER-DISTRIBUTER.

942,792. Specification of Letters Patent. Patented Dec. 7, 1909.

Application filed September 8, 1909. Serial No. 516,662.

*To all whom it may concern:*

Be it known that we, EARL P. PATTERSON and JACOB T. PATTERSON, citizens of the United States, residing at Griffin and Milner, respectively, in the counties of Spalding and Pike, State of Georgia, have invented new and useful Improvements in Combined Seed-Planters and Fertilizer-Distributers, of which the following is a specification.

This invention relates to seed planters in general and more particularly to that class of seed planters which are used for planting cotton seed and the like; and the invention has for its objects to provide a seed planter of simple and improved construction which without any particular alteration may be successfully utilized for distributing guano, bone dust and other similar fertilizers in powder form.

A further object of the invention is to provide a device of the class described with a simple and improved regulating mechanism whereby the quantity of seed or other material deposited by the planter may be regulated.

Still further objects of the invention are to simplify and improve the general construction and operation of a machine of the class described.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being however understood that no limitation is necessarily made to the precise structural details therein exhibited, but that changes, variations and modifications within the scope of the invention may be resorted to when desired.

In the drawings: Figure 1 is a side elevation of a combined seed planter and fertilizer distributer constructed in accordance with the invention. Fig. 2 is a longitudinal vertical sectional view of the seed box and showing also the portion of the beam supporting the same, said view being taken on the plane indicated by the line 2—2 in Fig. 3. Fig. 3 is a vertical transverse sectional view taken on the plane indicated by the line 3—3 in Fig. 2. Fig. 4 is a vertical sectional view taken transversely through the beam and showing in elevation the transporting wheel and the sustaining means for the same. Fig. 5 is a perspective detail view showing the seed tube detached.

Corresponding parts in the several figures are denoted by like characters of reference.

The improved planter and fertilizer distributer comprises a seed box or hopper 5, the bottom of which has a downward projection 6 and an aperture 7, the latter being located in proximity to one of the side walls of the box. A seed tube 8 of suitable construction is provided adjacent to its upper edge with a flange 9 having an aperture 10 adapted to receive the downward projection or stud 6 formed upon the underside of the seed box, the parts being so proportioned that when they are assembled, the mouth of the seed tube shall be in registry with the aperture 7 of the seed box. The seed box 5 and the flange 9 are connected together and with the beam 11 upon which the seed box is supported, by means of connecting members such as bolts 12 for the passage of which suitable apertures are provided in the several members. The beam 11 is provided adjacent to the bottom of the seed box and to the flange 9 of the seed tube with a transverse recess 13 in the bottom of which a wear plate 14 is placed to support the transversely movable regulating slide 15 for the passage of which slots 16 are formed in the side walls of the seed tube adjacent to the underside of the flange 9. It will be observed that when the parts are properly assembled, the seed tube 8 will be located adjacent to one side of the supporting beam 11 as will be clearly seen in Figs. 1 and 3 of the drawings.

The side walls of the seed box are provided with bearings wherein a transverse shaft 17 is supported for rotation, said shaft being provided with a plurality of radially extending fingers 18 which are preferably disposed in spiral series upon the circumference of the shaft. A cross bar 19 supported upon the side walls of the seed box a suitable distance above the shaft 17 is provided with downwardly extending arms or agitators 20 which are so disposed as not to interfere with the rotation of the shaft carrying the fingers 18. Some of said fingers are made of greater width than the others so as to constitute paddles which are specially designated 18′, said paddles being preferably disposed adjacent to the side walls of the box, and arranged to project upon diametrically opposite sides of the shaft.

One end of the shaft 17 which projects through the side walls of the seed box carries a sprocket wheel 21 which is connected by a chain 22 with the sprocket wheel 23 upon the axle 24 of the transporting wheel 25 which is supported for rotation adjacent to one side of the beam near the front end of the latter. The axle or spindle 24 is formed upon a plate or bracket 26 which is firmly secured by screws, bolts or other suitable fastening means 27 upon the side of the beam as will be clearly seen in Fig. 4 of the drawings, by reference to which it will also appear that the underside of the beam is supported direct upon the spindle 24, it being found that by this construction the strain caused by the weight of the beam will be evenly distributed. A keeper 28 suitably secured upon the beam serves as a guard for the upper portion of the wheel, and to prevent the chain 22 from interfering with the latter.

Pivotally mounted upon either side of the seed box is a beam 29 having a downwardly extending and forwardly curved standard 30 serving to support the coverer 31. Furrow openers 32 of any approved construction may be supported upon the standard 33 of a beam 34 which is pivotally mounted upon the side of the main supporting beam 11 directly in front of the seed tube. The beam 34 is formed with a head 35 having a plurality of apertures 36 for the passage of a fastening member 37 whereby the standard 34 may be secured at various adjustments; an arcuate brace 38 connects the seed box 5 with the beam 11, said brace being concentric with the pivot 39 of the beams 30 which latter may be adjustably connected with the brace 38 by means of a bolt 39 passing through one of a plurality of perforations 40 in the said brace, thus enabling the coverer to be vertically adjusted as will readily appear.

The beam 11 is equipped with handles 41 that are suitably connected with the heel of the beam by means of braces as 42.

From the foregoing description taken in connection with the drawings hereto annexed the operation and advantages of this invention will be readily understood by those skilled in the art to which it appertains. When the machine is in operation the contents of the seed box will be agitated by the stationary fingers or agitators 20 in conjunction with the fingers and paddles 18 and 18′ extending from the rotary shaft, and owing to the spiral arrangement of said fingers and paddles the contents of the box will be carried to the aperture 7 from which it escapes to the seed tube through the corresponding aperture 43 in the regulating slide 15 which latter may be adjusted so as to gage the quantity of material permitted to escape from the seed box when desired. For the purpose of conveniently manipulating the regulating slide it is preferred to provide a lever 44 fulcrumed upon a lug 45 that projects from one side of the seed box; the lower end of said lever being suitably connected with the regulating slide, and the upper end of the lever being confined in a keeper 46. It is also preferred to provide the lever 44 with a slot 47 through which projects a screw 48 projecting from one side of the seed box and having a nut 49 disposed in the path of the lever the throw of which is thereby regulated and limited. It will be readily seen that by properly adjusting the nut 49, the lever 44 may be manipulated to adjust the position of the regulating slide to control the escape of the contents of the box, or to cut off the escape of such contents entirely.

The improved machine will be found useful and serviceable not only for depositing seeds of various kinds, especially including cotton seed, but also for the purpose of dropping or depositing fertilizing material.

The construction is simple and inexpensive, and the device may be found thoroughly efficient for the purposes for which it is provided.

Having thus described the invention, what is claimed is—

1. In a machine of the class described, a supporting beam having a transverse recess, a wear plate in the bottom of said recess, a hopper having a downwardly extending stud, a seed box having a flange apertured to engage said stud, the side walls of said box being provided with transverse slots, a regulating slide seated for transverse movement between the flange of the seed tube and the wear plate, and means for adjusting said slide to regulate the escape of material from the seed box.

2. In a machine of the character described, a supporting beam, a seed box, an arcuate brace connecting the seed box with the beam and having a plurality of transverse perforations, a beam pivoted upon the side of the seed box concentric with the arcuate brace, a coverer carried by said beam, and means for connecting the latter adjustably with the arcuate brace.

3. In a machine of the character described, a supporting beam, a seed box supported thereon, a seed tube connected with the box and located adjacent to one side of the beam, a regulating slide extending transversely through the seed tube, means for operating said slide, a shaft supported for rotation in the seed box and having spirally disposed fingers, a transporting wheel supporting the front end of the beam, means for transmitting motion from the transporting wheel to the rotary shaft in the seed box, and auxiliary beams adjustably connected with the supporting beam and with the seed box and carrying furrow opening and covering means.

In testimony whereof we affix our signatures in presence of two witnesses.

EARL P. PATTERSON.
JACOB T. PATTERSON.

Witnesses:
J. P. PARKS,
B. T. WOODALL.